United States Patent
Yang et al.

(10) Patent No.: US 7,885,040 B2
(45) Date of Patent: Feb. 8, 2011

(54) SUSPENSION WITH LOCALLY STRENGTHENED GIMBAL

(75) Inventors: Chao-Hui Yang, Milpitas, CA (US); Qinghua Zeng, Fremont, CA (US); Yen Fu, San Jose, CA (US); Ellis T. Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 608 days.

(21) Appl. No.: 11/774,512

(22) Filed: Jul. 6, 2007

(65) Prior Publication Data

US 2009/0009911 A1    Jan. 8, 2009

(51) Int. Cl.
*G11B 5/55*    (2006.01)
(52) U.S. Cl. .................................. 360/254.8
(58) Field of Classification Search .......... None
See application file for complete search history.

(56) References Cited

U.S. PATENT DOCUMENTS

| | | | |
|---|---|---|---|
| 5,877,920 A * | 3/1999 | Resh ........................ | 360/245.7 |
| 6,151,197 A * | 11/2000 | Larson et al. ............... | 360/255 |
| 6,215,627 B1 * | 4/2001 | Resh et al. ............... | 360/245.6 |
| 6,611,402 B1 * | 8/2003 | Mangold .................... | 360/255 |
| 6,697,228 B1 * | 2/2004 | Mei et al. ................. | 360/245.3 |
| 6,930,860 B1 * | 8/2005 | Coffey ..................... | 360/294.4 |
| 7,365,945 B2 * | 4/2008 | Fujimoto et al. ............ | 360/255 |
| 7,403,357 B1 * | 7/2008 | Williams ................... | 360/245.9 |
| 7,450,347 B2 * | 11/2008 | Suzuki et al. ............... | 360/255 |
| 7,489,478 B2 * | 2/2009 | Agari et al. ............... | 360/245.7 |
| 2006/0028767 A1 * | 2/2006 | Zhou et al. ................ | 360/244.2 |

OTHER PUBLICATIONS

"Non-op Shock Improvement," HGA Engineering, NHK Olive R1 (Samsung N40), Rev A, Jun. 28, 2006, by Qing Hua Zeng et al., TDK/SAE Confidential, Oct. 1, 2009, 6 pages.

* cited by examiner

*Primary Examiner*—Mark Blouin
(74) *Attorney, Agent, or Firm*—Saile Ackerman LLC; Stephen B. Ackerman; Rosemary L. S. Pike

(57) ABSTRACT

An apparatus with a head gimbal assembly designed to reduce movement and rotation of components of the head gimbal assembly structure is disclosed. One embodiment head gimbal assembly may comprise a flexure including a ramp limiter, a suspension assembly further comprising a suspension tongue, a slider further comprising a magnetic head; and a load beam further comprising a lift tab; and a ramp further comprising a step to engage and support the ramp limiter and support and constrain the movement of the slider. In certain embodiments, the flexure may further comprise a flexure rail located at its end to reduce movement and rotation of the suspension tongue.

24 Claims, 6 Drawing Sheets

SUSPENSION WITH LOCALLY STRENGTHENED GIMBAL

BACKGROUND OF THE INVENTION

A. Field of the Invention

The present invention is directed to head gimbal assemblies utilized in hard disk drive assemblies. More specifically, the present invention pertains to a head gimbal assembly designed to reduce movement and rotation of components of the head gimbal assembly structure.

B. Description of the Related Art

Presently, the hard disk drive industry is observing great success in the consumer electronics environment. One of the main reasons for this success is the ability to achieve ever increasing storage capacity reflecting consumer demand. So far, these advancements are being achieved with minimal cost compared to other competitive technologies.

However, continuing these advances require overcoming arising design and manufacturing difficulties. These difficulties can be found both in the drive level and the component level.

Hard disk drives (HDD) are normally utilized as the major storage units in a computer. Generally, HDDs operate by retrieving and storing digitized information stored on a rotating disk. This retrieving and storing (i.e., "reading" and "writing") is done by a magnetic "head" embedded on a ceramic "slider" which is mounted on a "suspension". The assembled structure of slider and suspension is usually called the head gimbal assembly (HGA).

A typical slider body is shown in FIG. 1. As shown in FIG. 1, an air bearing surface (ABS) design 102 known for a common slider 104 may be formed with a pair of parallel rails 106 and 108 that extend along the outer edges of the slider surface facing the disk. The two rails 106 and 108 typically run along at least a portion of the slider body length from the trailing edge 110 to the leading edge 112. The leading edge 112 is defined as the edge of the slider that the rotating disk passes before running the length of the slider 104 towards a trailing edge 110. The transducer or magnetic element is typically mounted at some location along the trailing edge 110 of the slider as shown in FIG. 1.

The operation of a typical slider is shown in FIG. 2. A suspension 204 supports the head gimbal assembly (HGA) 202 over the moving disk 206 (having edge 208) and moving in the direction indicated by arrow 210. Suspension 204 typically consists of multiple components, including a loadbeam, gimbal, electrical traces, a hinge and a baseplate. In operation of the disk drive, as shown in FIG. 2, an actuator 212 moves the HGA over various diameters of the disk 206 (e.g., inner diameter (ID), middle diameter (MD) and outer diameter (OD)) over arc 214.

In order to achieve maximum hard disk drive performance, the head must fly as close to the surface of the disk as possible while still maintaining a consistent, required spacing. This spacing is also known as the "flying height" or "magnetic spacing" of the disk. When a disk is rotated, it carries with it a small amount of flowing air (substantially parallel to the tangential velocity of the disk) on its surface that acts to support a magnetic head flying above, thereby creating the "flying height" of the head above the disk. Typically, the slider supporting the head is aerodynamically shaped to use the flow of this small amount of air to maintain a uniform distance from the surface of the rotating disk (e.g., 10 nm), thereby preventing the head from contacting the disk. The surface of the magnetic head closest to the disk (and being supported by the flowing air) is referred to as the "air bearing surface". In order to make the slider fly stably and reliably in such a small gap, various design and geometric criteria including vertical stiffness ($K_z$), gimbal pitch and roll stiffness ($K_p$,$K_r$), gimbal static attitude—including pitch and roll attitude (PSA/RSA), and operational shock performance (G/gram) must be optimally designed and maintained to ensure performance.

In FIG. 1, the rails 106 and 108 form the air bearing surface on which the slider flies, and provide the necessary lift upon contact with the air flow created by the spinning disk. As the disk rotates, the generated wind or air flow runs along underneath, and in between, the slider rails 106 and 108. As the air flow passes beneath the rails 106 and 108, the air pressure between the rails and the disk increases thereby providing positive pressurization and lift. In general, as the air bearing surface area increases, the amount of lift created is also increased. Therefore, as a design criteria, there is a need for a method that allows for design of a flying height constituting the minimal amount of spacing between the head and the disk required for successful operation of the hard disk drive.

In addition, the flying height and the surface roughness of the disk drive components must be designed to preserve the mechanical operating parameters of the head, such as crown, camber and twist. The "crown" represents a deformation in shape along forward and aft directions of the slider (as shown by the Y-Y plane), and the "camber" represents a deformation in shape along lateral directions of the magnetic head slider (as shown by X-X plane). Crown and camber are shown in FIG. 3.

Another requirement is the suspension assembly have little or no "dynamic effect" on the performance of the slider air bearings. A dynamic effect is the result of head-disk contact. This may result from contact, or operation in higher altitudes where the air is thinner (thereby lowering the flying height). As a result, the suspension and the slider are both set into motion, causing the dynamic effect.

Besides those operational requirements, HGAs need to meet some non-operational requirements, such as non-operational shock robustness. During a shock event, the solder joining the individual component parts of the HGA experience stress. When the stress level experienced by the solder joints is higher than the strength of the material, cracks may begin to form, thereby jeopardizing the operational performance of the disk drive. In addition, with the continuous application of the stress on the solder joints, the components of the HGA may bend, further jeopardizing operational performance.

Furthermore, the forces experienced by the HGA during the shock event may disrupt the electrical trace connections in the HGA. Typically, during these shock events, the force on the HGA may cause the tongue and the slider to rotate, thereby pulling trace connections away from soldered joints and increasing stress. Such stress and deformation typically leads to operational failure.

Therefore, in order to maintain the structural and electrical connectivity integrity of the solder joints and maintain the operational design shape of the ramp limiter, a more optimum design geometry for the flexure is desired.

DETAILED DESCRIPTION OF THE DRAWINGS

An apparatus for the present invention pertains to suspension with locally strengthened gimbal. In embodiments of the present application, the suspension design may include a formed rail along the flexure sides to stiffen the optimal local region of the HGA.

Figure 1:
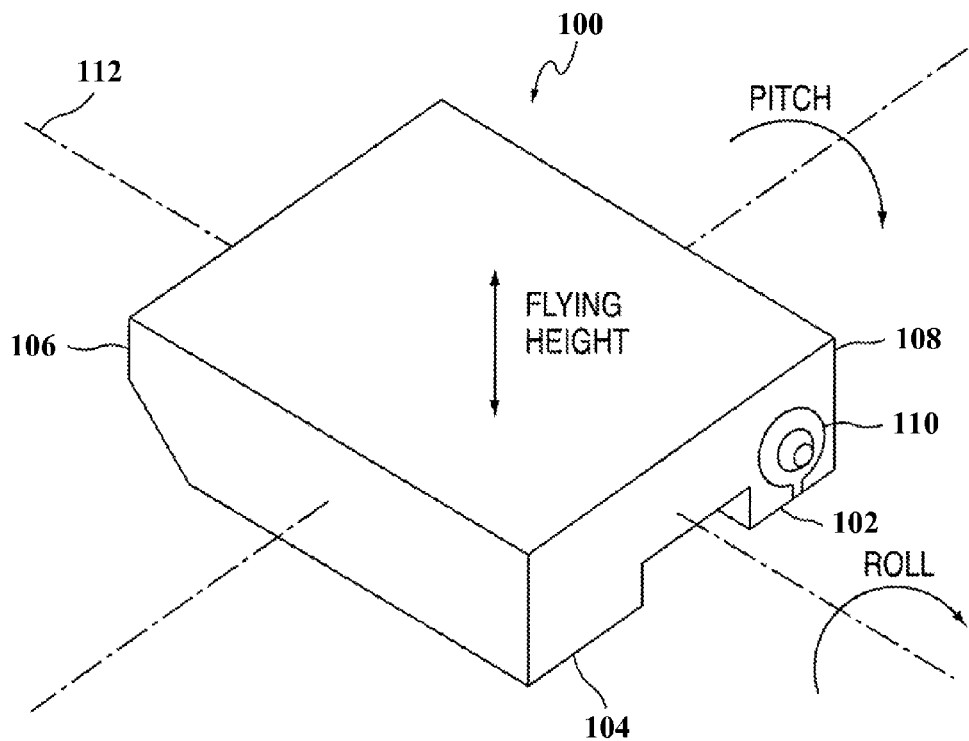
FIG. 1 provides an illustration of a typical slider.
Figure 2:
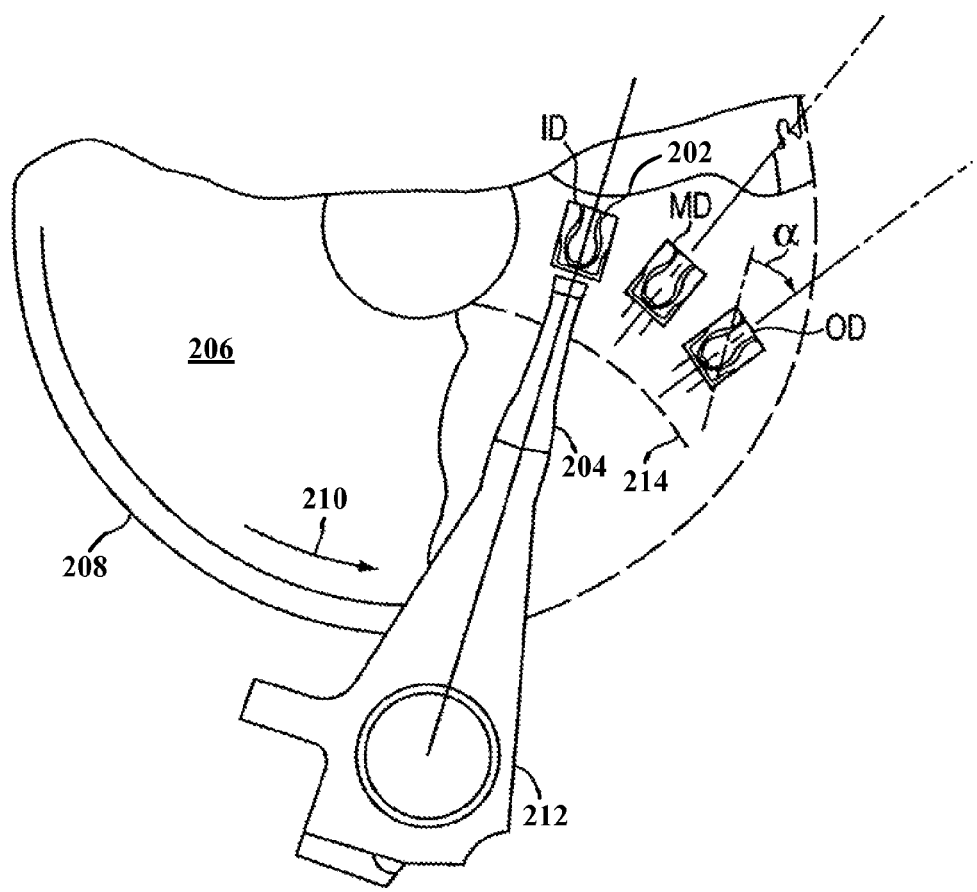
FIG. 2 provides an illustration of the typical operation of a typical slider.
Figure 3:
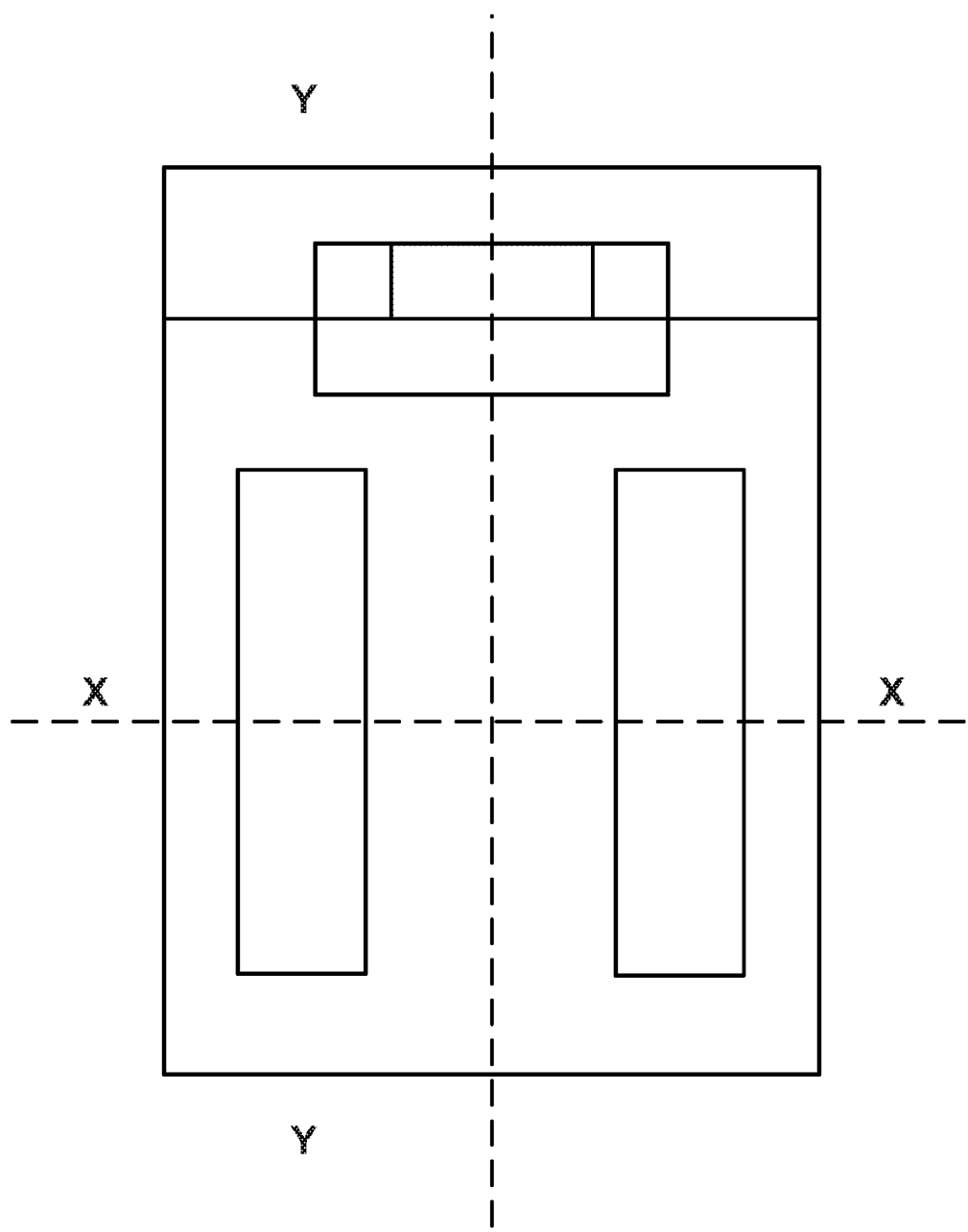
FIG. 3 provides an illustration of crown and camber on a slider.
Figure 4:
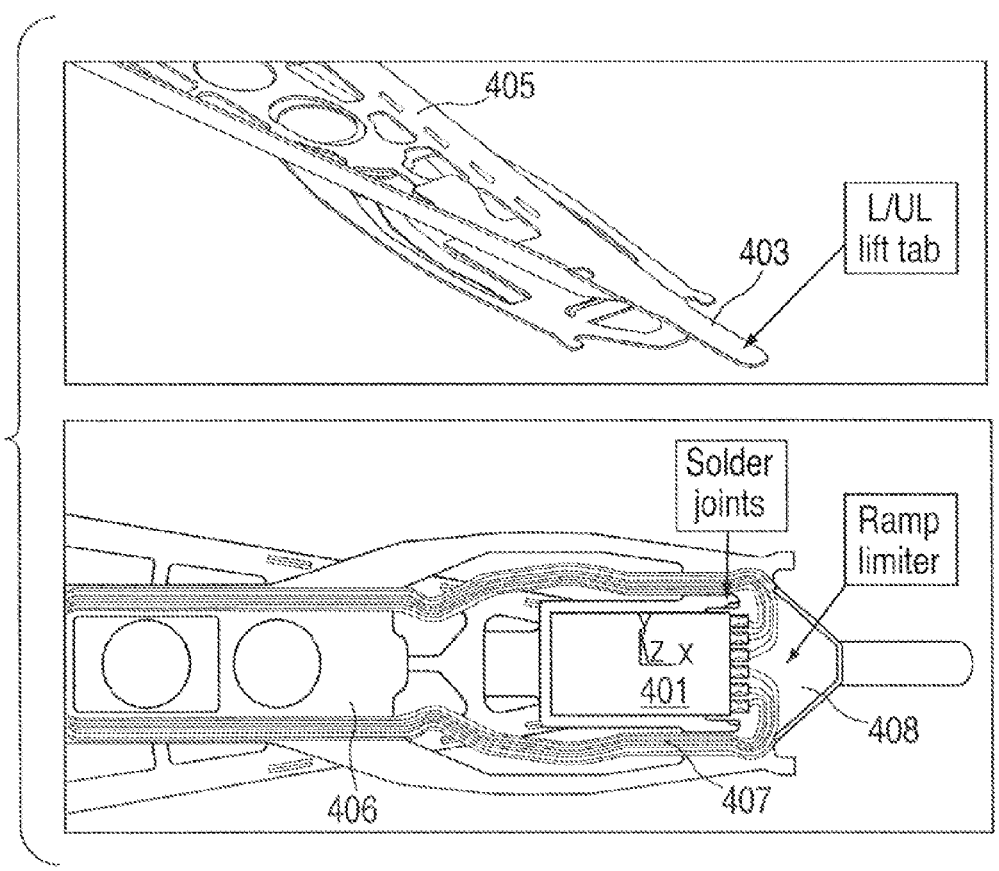
FIG. 4 provides an illustration of head gimbal assembly embodiment according to the present invention.

A head gimbal assembly embodiment according to the present invention is shown in FIG. 4. The slider 401 rests on a ramp (see below), which is further supported by a lift tab 403 located at the end of the suspension 404. Trace connections 407 are located proximately to the slider. The ramp 402 may include a "step" (see below) to constrain the movement of the slider. The lift tab is typically an extension of the load beam 405. During operation, the slider 401 and the flexure 406 may come in contact with the load beam 405. The flexure 406 extends further beyond the slider to form a ramp limiter 408. Typically, the amount of force exerted during this type of operational contact may be in the range of 0.2-0.3 gram force.

Figure 5:
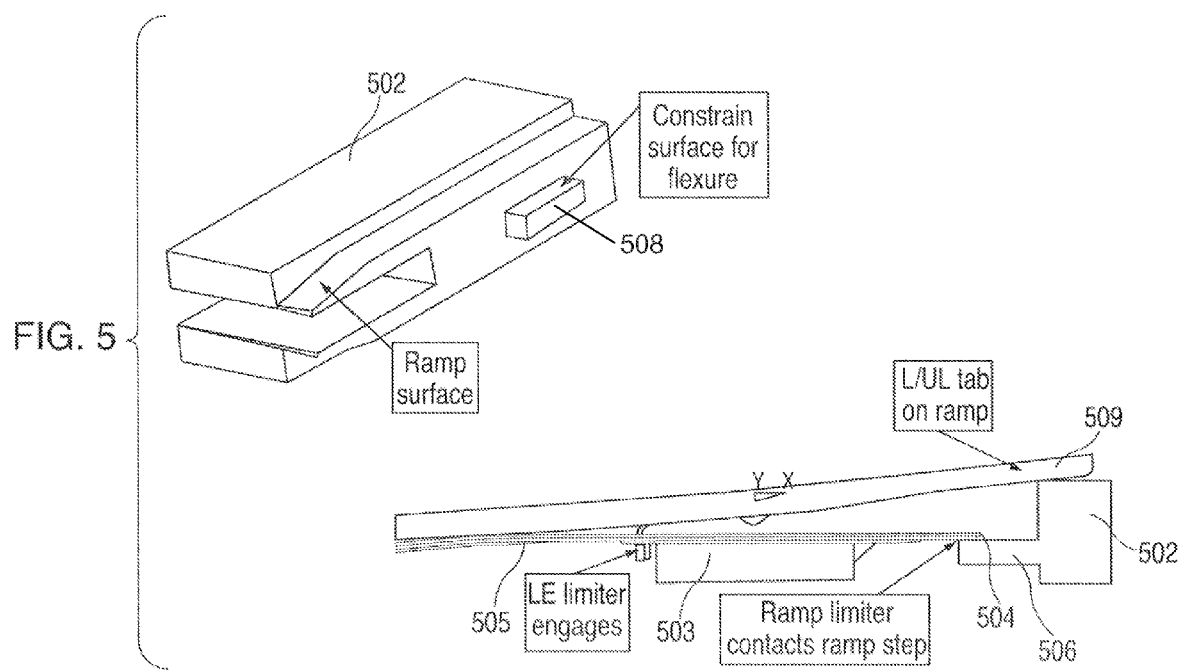
FIG. 5 provides an illustration of head gimbal assembly embodiment according to the present invention.

FIG. 5 provides an illustration of a head gimbal assembly according to the present invention. FIG. 5a illustrates a ramp embodiment 502 including ramp constraining surface 508 according to one embodiment of the present invention. FIG. 5b illustrates a ramp embodiment 502 in conjunction with the slider 503 and the lift tab of the load beam 509 according to one embodiment of the present invention. When the HGA 501 is resting on the ramp 502, the slider 503 is free to move until the ramp limiter 504 on the flexure 505 comes in contact with the step 506 on the ramp 502.

Figure 6:
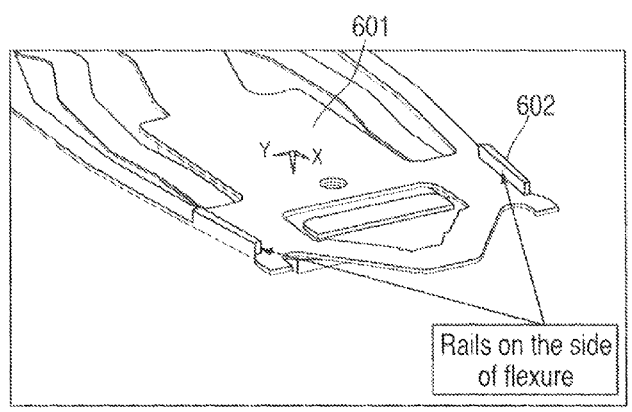
FIG. 6 provides an illustration of an embodiment according to the present invention.

FIG. 6 illustrates an embodiment of a flexure assembly according to the present invention designed to reduce movement, and specifically, rotation of the suspension tongue during contact events. The flexure assembly 601 may include rails 602 to stiffen the local region and enhance energy dissipation during contact events. In this embodiment (as shown in FIG. 6), the flexure rails are vertical, generally linear elevations or ridges. In other embodiments, these rails may take different shapes or be of non-uniform height. The rails 602 operate to reduce the rotation of the suspension tongue (not shown). In fact, finite element analysis shows embodiments of the present invention including the rails 602 may reduce solder joint stress by approximately 20-30%.

Figure 7:
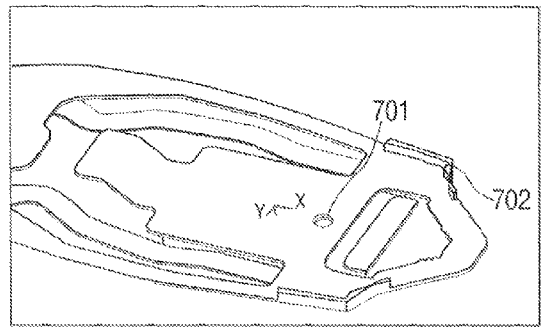
FIG. 7 provides an illustration of an embodiment according to the present invention.

FIG. 7 illustrates a second embodiment of the present invention. In certain embodiments of the present invention, the formed flexure rails may be located at regions with large rotational displacement. Typically, the flexure rails can be formed with current forming processes. In this embodiment, the rails 702 located at the ends of the flexure assembly 701 are extended to the ramp limiter (not shown). By extending the rails 702 to the ramp limiter, deformation of stress-bearing components (particularly the ramp limiter) is greatly reduced. In other embodiments of the present invention, the flexure rails may be located on the trailing edge of the slider.

In this embodiment, the flexure rails are not linear, but instead extend inward along the flexure outer edges. In other embodiments, the flexure rails may be any shape required to extend along any portion of the flexure. In addition, in some embodiments the flexure rail may be interrupted or staggered.

According to certain embodiments of the present invention, the ramp limiters may be located in multiple regions of the flexure. Furthermore, in embodiments of the present invention, the flexure rails may come in any number of pairs. Moreover, each of these pairs may be located symmetrically (either along longitudinal or latitudinal axis) at different locations on the flexure.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A head gimbal assembly comprising:
    a flexure comprising:
        a ramp limiter; and
        a flexure rail located at the flexure's end;
    a suspension assembly further comprising
        a suspension tongue,
        a slider further comprising a magnetic head; and
        a load beam further comprising a lift tab; and
    a ramp further comprising a step to engage and support the ramp limiter and support and constrain the movement of the slider wherein the flexure rail protrudes orthogonally from the surface of the suspension tongue opposite the slider bearing surface and wherein the flexure rail reduces movement and rotation of the suspension tongue.

2. The head gimbal assembly of claim 1, wherein the flexure rail is located along the sides of the flexure.

3. The head gimbal assembly of claim 1, wherein the flexure rail is one of a pair of flexure rails.

4. The head gimbal assembly of claim 1, wherein the flexure rail is extended to the ramp limiter.

5. The head gimbal assembly of claim 2, wherein the flexure rail is located along the trailing edge of the slider.

6. The head gimbal assembly of claim 1, wherein flexure rail comprises vertical ridges.

7. The head gimbal assembly of claim 2, wherein the flexure rail extends along the sides of flexure generally linearly.

8. The head gimbal assembly of claim 2, wherein the flexure rail extends along the sides of flexure non-linearly.

9. The head gimbal assembly of claim 1, wherein the flexure rail is staggered.

10. The system of claim 1, wherein the flexure rail is one of a pair of flexure rails.

11. The system of claim 10, wherein the pair of flexure rails is one of a plurality of pairs of flexure rails.

12. The system of claim 11, wherein each of the pair of flexure rails is located symmetrically on different locations on the flexure.

13. A system comprising:
    a disk containing data;
    a printed circuit assembly to control the magnetic head;
    a connection plate electrically coupling the magnetic head to the printed circuit assembly; and
    a head gimbal assembly including:
        a flexure comprising:

a ramp limiter; and
a flexure rail located at the flexure's end;
a suspension assembly further comprising
a suspension tongue,
a slider further comprising a magnetic head; and
a load beam further comprising a lift tab; and
a ramp further comprising a step to engage and support the ramp limiter and support and constrain the movement of the slider wherein the flexure rail protrudes orthogonally from the surface of the suspension tongue opposite the slider bearing surface and wherein the flexure rail reduces movement and rotation of the suspension tongue.

14. The system of claim 13, wherein the flexure rail is located on the sides of the flexure.

15. The system of claim 13, wherein the flexure rail is located along an edge of the slider.

16. The system of claim 13, wherein the flexure rail is extended to the ramp limiter.

17. The system of claim 13, wherein the flexure rail is located along the trailing edge of the slider.

18. The system of claim 13, wherein flexure rail comprises vertical ridges.

19. The system of claim 14, wherein the flexure rail extends along the sides of flexure generally linearly.

20. The system of claim 14, wherein the flexure rail extends along the sides of flexure non-linearly.

21. The system of claim 13, wherein the flexure rail is staggered.

22. The system of claim 13, wherein the flexure rail is one of a pair of flexure rails.

23. The system of claim 22, wherein the pair of flexure rails is one of a plurality of pairs of flexure rails.

24. The system of claim 23, wherein each of the pair of flexure rails is located symmetrically on different locations on the flexure.

* * * * *